United States Patent [19]

Taylor

[11] Patent Number: 5,379,643
[45] Date of Patent: Jan. 10, 1995

[54] MOUNT ASSEMBLY FOR USE WITH VIBRATION TRANSDUCERS

[75] Inventor: James K. Taylor, Columbus, Ohio

[73] Assignee: IRD Mechanalysis, Inc., Columbus, Ohio

[21] Appl. No.: 95,667

[22] Filed: Jul. 21, 1993

[51] Int. Cl.⁶ ............................................. G01N 29/04
[52] U.S. Cl. ...................................... 73/654; 73/661; 310/328
[58] Field of Search .................. 73/654, 496, 652, 644, 73/649, 660, 661, 866.5; 310/328, 329, 338

[56] References Cited

U.S. PATENT DOCUMENTS

| | | | |
|---|---|---|---|
| 3,181,350 | 5/1965 | Thomas et al. | 73/661 |
| 3,503,252 | 3/1970 | Miller | 73/644 |
| 3,859,847 | 1/1975 | Ronemus | 73/661 |
| 4,038,866 | 8/1977 | Johnson | 73/654 |
| 4,827,771 | 5/1989 | Cary et al. | 73/644 |
| 5,024,095 | 6/1991 | Warner | 73/661 |

Primary Examiner—Hezron E. Williams
Assistant Examiner—Helen C. Kwok
Attorney, Agent, or Firm—Mueller and Smith

[57] ABSTRACT

An assembly is provided for mounting a vibration transducer such as an accelerometer with a hand grip and probe for hand-held vibration data gathering. By the simple maneuvering of plugging in a transmission cable and accelerometer connector, following which a forward retainer is screwed down upon the accelerometer and probe assembly, a hand grip based device is provided. Conversely, a configuration utilizing an accelerometer alone or with a permanent magnet becomes available with a simple demounting procedure involving merely the untightening of the forward retainer and the plugging in of a transmission cable. This affords the technician a simple opportunity for using a desired hand grip and hand grip based entry switch as well as a convenient technique for utilizing an accelerometer in stand-alone fashion or with a permanent magnet connector feature.

20 Claims, 6 Drawing Sheets

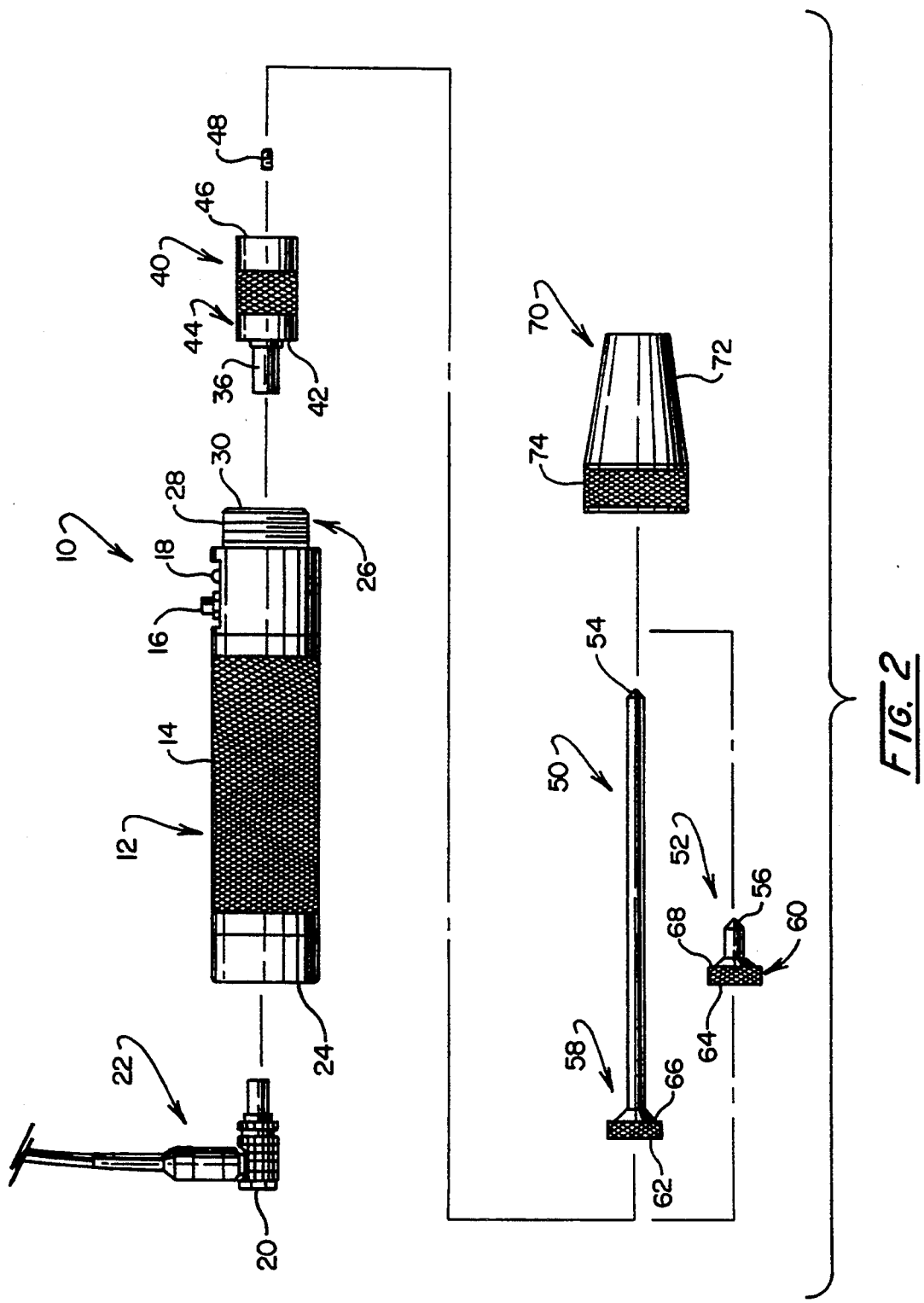

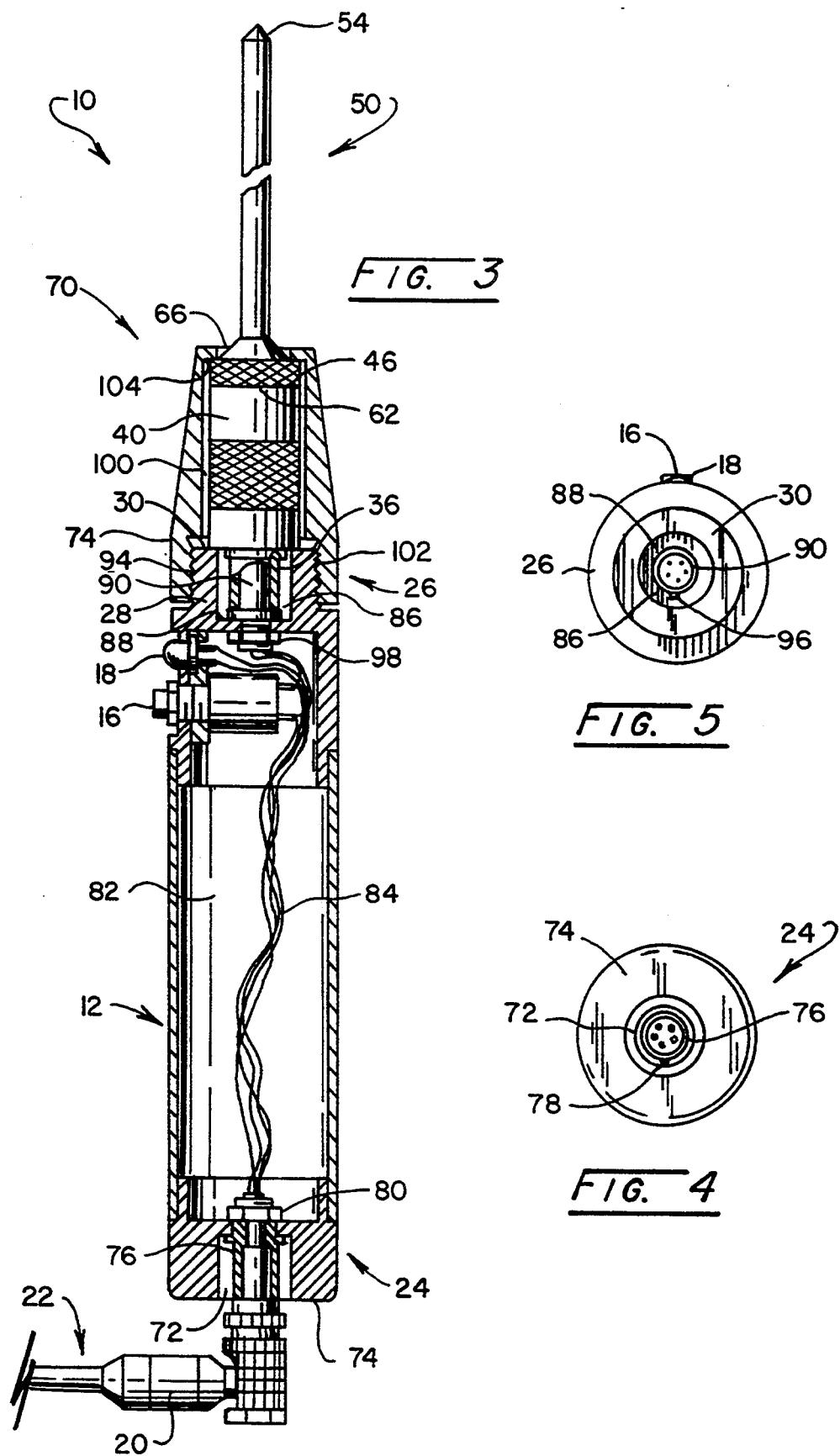

MOUNT ASSEMBLY FOR USE WITH VIBRATION TRANSDUCERS

BACKGROUND OF THE INVENTION

Industry now generally recognizes the benefits of structured preventive maintenance programs under which the performance of production machinery and tooling is continuously or periodically monitored. Such monitoring has many aspects, however, one substantially developed surveillance field is concerned with the vibrational aspects of rotational machinery. An evaluation of the performance state of a machine may be carried out utilizing industrial vibration analyzers in conjunction with a transducer such as an accelerometer, a velocity or displacement pick-up. These devices provide outputs representing those units of measurement which are treated by sophisticated filtering, averaging, integrating, digitization and the like, to develop numerical values for analysis in terms of amplitudes, time, and frequency domains and the like.

Experienced technicians, using dedicated analytical software, employ such numerical data to evaluate trends and rather accurately predict optimum maintenance intervals, as well as break-downs. These technicians also utilize portable analyzing systems for carrying out such analysis at the situs of a machine undergoing investigation.

The collection of vibrational data as part of a structured preventive maintenance program varies with the production criticality of the machinery and tooling involved. Highly critical devices may be under continuous surveillance. In this regard, the transducers employed at the commencement of the data collection scheme are securely fastened to the machines, for example, utilizing threaded studs and the like. The data collected from such fixed installations is typically transmitted by permanent transmission cables to a monitoring station for compilation and analysis. Less critical data may be acquired using hand-held vibration meters. Over the recent past, an intermediate data collection approach involving a portable, microprocessor-driven data collector has achieved popularity, a highly successful, pioneering data collector, for example, being described in U.S. Pat. No. 4,612,620, by Davis, et al., entitled "Apparatus for Collecting Scheduled Maintenance Data", issued Sep. 16, 1986, and assigned in common herewith. In general, the data collectors perform in connection with a scheduling facility such as a personal computer having software designed to download a predetermined data collection route into the portable device. The user of the device then actuates any of a number of keys at a keyboard on the hand-held device, and moves from position to position along a displayed "route" of data collection, placing a transducer coupled via transmission cable to the data collector upon each measurement position. Those measurement positions are detailed in terms of units of measurement, orientation of the probe, and the like, at a readout on the collector. The user then actuates a collection program generally by depressing a push-button and the data is collected from the transducer, whereupon it is subjected to certain signal treatment such as filtering, integration and is then digitized and placed in memory. At the end of a data collection period, the user then reconnects the data collector with the scheduling facility and uploads collected data for analysis at that facility.

As is the case with any form of data collection, the data collected is only as good as the quality of its derivation at the beginning of the process. This point of derivation is the connection between the transducer and the machine under surveillance. The most preferred and most accurate collection approach is one wherein the transducer is physically connected to the machine being evaluated. Typically, as noted above, this is carried out utilizing a threaded stud. Where that secure connection between transducer and machine cannot practically be achieved, then collection turns to approaches wherein less accurate but still valuable data are developed. For example, where no "hard" connection can be made between the transducer and a machine, a strong permanent magnet may be attached to the transducer to hold it against the machine. Such an approach to coupling generally results in a loss, for example, of high frequency vibration data. A less desirable next but practical approach to data collection is by hand-holding a transducer assembly against the machine during the interval of data collection. Such an approach often is used where the point to be measured on the machine is essentially otherwise inaccessible or may represent a region wherein hand-positioning a transducer would impose a safety hazard. For such data collection, the industry has resorted to the utilization of probe devices which are attached to the transducers. The combined transducer and probe assembly then is hand-held against the machine measurement position. As before, this approach to measurement results in, for example, high frequency fall-off. To aid in the physical collection of data using a probe coupled transducer, it also is desirable to provide for actuation of the entry or store function in the data collector utilizing the hand which is holding the probe. Where such an arrangement is provided, then the user may hold the portable device in one hand, observing numerical values for the data being collected, while actuating the store button and holding the transducer probe assembly in position against the machine monitoring point with the other hand.

For any vibration data collection employing data collector devices, portable analyzers and the like, it is highly desirable that the user have the ability to optimize transducer utilization. Accordingly, where a transducer can be threadably attached to the measurement point, then that most accurate form of data collection should be utilized. Alternately, where the transducer alone utilizing a strong magnet may be employed in the absence of some "hard" connection, then that next desired approach should be utilized. Finally, for points of measurement where the former two approaches are inefficient or unavailable to the user, then the probe approach may be made employed without undue additional procedure. As is apparent, a convenience of flexibility in configuring a transducer based pick-up for the above delineated modes of attachment would be quite advantageous.

SUMMARY

The present invention is addressed to a mount assembly for use with vibration monitoring transducers which provides a desirable flexibility in configuring them for different modes of measurement. Where the transducer is to be configured with a probe, hand grip and switch, the mount assembly achieves that component combination with a simple plug-in procedure and hand tightening of a threaded forward retainer. Demounting of the transducer from the handle component simply involves the reverse of that procedure. Thus, the transducer then is conveniently configurable for attachment to a machine vibration measurement point using a permanent magnet coupling or hard connection employing a threaded stud. The mount assembly provides both a grip of ergonometrically desired diameter and provides for the support of a convenient, thumb-actuated store switch. To provide easily perceived visual feedback to the technician that data is being collected and stored, a light emitting diode may be mounted adjacent the remote entry switch on the handle component. When the transducer is configured with the handle component and probe, its association with the probe and the mounting portion of the handle component advantageously is one of compressive abutment to promote the integrity of the collected vibrational data.

A feature of the invention is to provide a mount assembly for use with a vibration transducer of a variety positioned at a machine point under evaluation having a transducer contact surface including a threaded coupler connectable with a threaded machine coupling and an oppositely disposed connector end including a back surface and a multiple lead transducer connector of predetermined configuration for removable coupling with the corresponding multiple lead cable connector of a transmission cable. The assembly includes a hand support component having a hand graspable handle portion extending between a forward mount portion and a rearward portion. The forward mount portion includes a contact surface and a multiple lead intermediate connector configured in correspondence with the cable connector for removable coupling with the multiple lead transducer connector. A second transducer connector configured in correspondence with the multiple lead transducer connector is mounted upon the hand support component for removable connection with the multiple lead cable connector. The hand support component further includes a first connector component formed upon it at the forward mount portion. A lead arrangement is provided for electrically coupling the second transducer connector and the intermediate connector. A probe having a machine contact end for positioning in abutting engagement with the machine point and extending to a base portion having a rearwardly disposed support surface and an oppositely disposed retention surface is provided, and a connector arrangement is provided for removably threadably connecting the probe base portion with the vibration transducer threaded coupler. A forward retainer is provided which has a rearward portion including a second connector component which is configured for effecting a constrictively tightening connection with the first connector component. The forward retainer has a hollow interior extending to an interior abutting surface which surmounts a tip opening and is configured for positioning over the transducer and the probe when the multiple lead transducer connector is coupled with the multiple lead intermediate connector, the transducer back surface is in abutment with the forward mount portion contact surface and the probe support surface is abuttably engaged with the transducer contact surface, and the interior abutting surface is in abutment with the probe retention surface. The forward retainer functions to urge the probe into compressive contact with the transducer and the transducer into compressive contact with the forward mount portion contact surface when the forward retainer second connector component effects the constrictive tightening connection.

As a further feature, the invention provides a machine vibration monitoring system employing a cylindrical accelerometer of given diameter, having an accelerometer contact end with a threaded bore and an oppositely disposed connector end with the back surface and an outwardly extending multiple lead transducer connector of predetermined configuration, the transducer connector being removably connectable with a corresponding cable connector of a transmission cable extending to the signal treatment components of a portable memory containing data receiver having a control circuit responsive to hand actuation to receive an output from the accelerometer when located at a machine point under evaluation, a mount assembly for use with the accelerometer which includes a hand support component having a hand-graspable cylindrical handle portion of first diameter with an internally disposed cavity. The handle portion extends between a forward mount portion and a rearward portion, and the forward mount portion includes a cylindrical, externally threaded first connector component extending forwardly to a contact surface and further includes a first receiving cavity extending inwardly from the contact surface within which is mounted an intermediate connector configured in correspondence with the cable connector and operatively receive the accelerometer outwardly extending transducer connector in an orientation effecting the abutment of the transducer back surface with the contact surface, the rearward portion supporting a second transducer connector of the predetermined configuration for removable connection with the cable connector. A lead arrangement is provided within the internally disposed of the handle portion cavity for electrically coupling the intermediate connector with the second transducer connector. A probe is provided having a contact surface for positioning in abutting engagement with the machine point and extending to a circular base portion of diameter corresponding with the accelerometer given diameter, the base portion having a rearwardly disposed support surface and an oppositely disposed retention surface. A connector arrangement is provided for removably, threadably connecting the probe base portion with the accelerometer threaded bore and effecting an abutting contact between the base portion and the accelerometer contact end. A forward retainer is provided which has an open, cylindrically shaped interior with a rearward portion including an internally threaded second connector component, the interior extending forwardly to an annulus-shaped interior abutting surface which is abuttably engageable with the probe retention surface when the transducer connector is coupled with the intermediate connector such that there is an abutment of the back surface with the contact surface, the probe base portion is in abutting contact with the accelerometer contact surface, the forward retainer is positioned over the probe, and the accelerometer and the second connector component effects the rotationally derived constrictive tightening connection with the first connector component.

As another feature, the invention provides a mount assembly for use with a vibration transducer locatable at a machine point under evaluation, having a transducer contact surface and an oppositely disposed connector end including a back surface an a transducer connector removably connectable with the cable connector of a transducer cable extensible to a portable data receiver having memory and which is responsive to a switched input to carry out a store function with respect to the memory. The assembly includes a hand support component having a hand graspable handle portion extending between a forward mount portion and a rearward portion. The forward mount portion includes a centrally disposed multiple lead intermediate connector configured in correspondence with the cable connector and a threaded first connector surmounting the intermediate connector. The hand support component further includes a second transducer connector corresponding with the cable connector and which is mounted upon a hand support component, and is removably connectable with the cable connector and in electrical communication with the intermediate connector. A switch is mounted upon the hand support component in electrical communication with the second transducer connector and which is hand actuable to derive the switched input. A probe having a machine contact end for positioning in abutting engagement at the machine point, and extending to a base portion is provided which is removably connectable with the transducer contact surface. A forward retainer arrangement is provided having a rearward portion including a threaded second connector threadably engageable with the first connector and having a hollow interior extending to a forwardly disposed interior abutting surface surmounting a tip opening and positionable over the transducer and the probe when the transducer connector is coupled with the intermediate connector and the probe base portion is connected with the transducer contact surface for retaining the probe and the transducer against the probe base portion.

The invention, accordingly, comprises the apparatus possessing the construction, combination of elements, and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 2 is an exploded view of the mount assembly of FIG. 1 showing an alternative for employing a foreshortened probe component;

FIG. 3 is a partial sectional view of the mount assembly of FIG. 1 with portions broken away in the interest of clarity;

FIG. 4 is a rear view of the assembly of FIG. 1 without the connection of a transmission cable and connector thereto;

FIG. 5 is a front view of the hand support component of the assembly shown in FIG. 2;

DETAILED DESCRIPTION OF THE INVENTION

Figure 1:
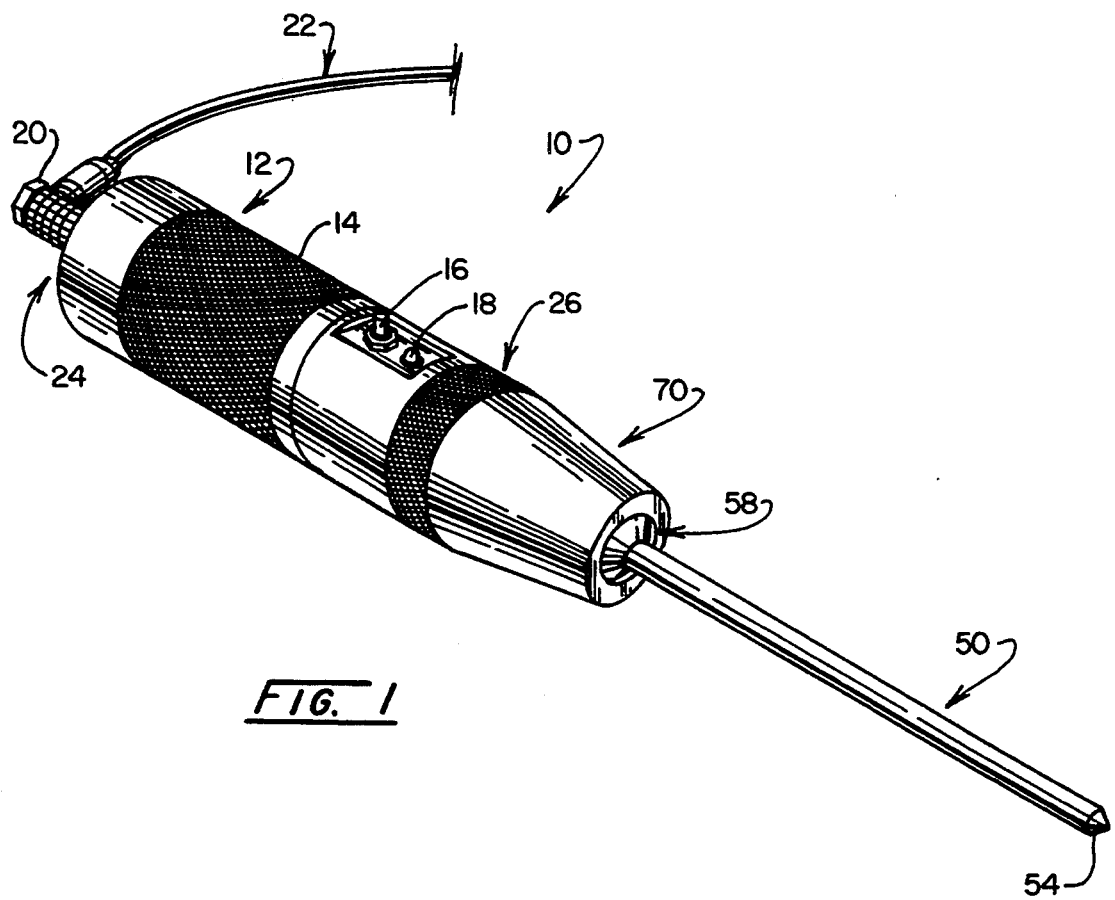
FIG. 1 is a perspective view of a mount assembly according to the invention in a configuration for utilizing an elongate hand-held probe.

The mounting apparatus of the invention supports a full and most advantageous utilization of a vibration transducer which is employed with portable data collectors and analyzers. Preferably, the transducer is provided as a solid-state seismic accelerometer, for example that marketed as a Model 943 by IRD Mechanalysis, Inc., of Columbus, Ohio. When the transducer is employed in conjunction with a probe device, then, preferably, the mounting apparatus is utilized and the demountable assembly takes the configuration shown in FIG. 1 in general at 10. The assembly 10 is easily and, importantly, safely grasped by the technician at a hand support component represented generally at 12 which is formed having a hand-graspable handle portion 14. Handle portion 14 includes a centrally-disposed knurled surface for the purpose of facilitating the grasping of it. The portion 14 additionally is configured having a diameter, for example of 1.35 in. (34.29 mm) and a length of about 4½ in. (114.3 mm). Thus kinesiologically designed, the portion 14 is held to position a contacting probe as at 50 against a vibrational surface throughout that sampling time which is required to achieve a good reading without undue fatigue. Such a comfortable grip is of importance inasmuch as for many measurement procedures, the technician is called upon to assume awkward stances. The handle portion 14 also supports a small thumb-actuated switch 16 which is provided for the convenience of the operator in utilizing a probe device. By pressing the switch, the technician instructs the control system to enter or store data. Such switches are of value in conjunction with the taking of data utilizing a probe inasmuch as one of the technician's hands generally is positioning the data collector instrument or console while the other hand holds the probe utilizing the handle 14. Switch 16 is actuated easily by the thumb of the hand holding the probe. Adjacent switch 16 is a light emitting diode (LED) 18 which is energized during the interval of data collection and is under the control of the microprocessor-driven hand carded instrument or console. This provides a visible feedback to the technician that data indeed is being collected and that it is important to maintain contact between the probe device and the point on the machinery being evaluated for vibration.

Communication with the hand-held microprocessor driven device is through the multiple lead connector 20 of a transmission cable represented generally at 22. The opposite end of this cable 22 (not shown) is coupled to the instrument being carried by the technician. Coupling of the connector 20 may be directly to the small accelerometer. However, for probe usage, that coupling now is made with a transducer connector (not shown) located at the rearward portion 24 of the handle portion 14.

FIG. 2 shows that the hand support component 12 extends to a forward mount portion represented generally at 26 which, in turn, includes a connector component 28 having a diameter less than the diameter of the handle portion 14 and is formed as an externally threaded cylinder. That cylinder extends to a contact surface 30 which is circular and is arranged perpendicularly to the central axis of the hand support component 12. A receiving cavity extending from the surface 30 inwardly into the connector component 28 serves to support a multiple lead intermediate connector which is configured in correspondence with and, for connection purposes, is essentially identical to the connector 20. This intermediate connector receives a multiple lead transducer connector 36 of a transducer here shown as an accelerometer 40. When assembled, the back surface 42 of the connector end 44 of accelerometer 40 is positioned in abutment against the contact surface 30 of the forward mount portion 26. Connection simply requires a plug-in motion on the part of the technician, a detent arrangement between the male and female components being utilized to facilitate proper alignment of the multiple leads of the connectors. The accelerometer 40 is conveniently small, being cylindrical in shape and having a diameter of about 0.70 in. (17.78 mm). The device 40 extends forwardly to a transducer contact surface 46 into which is provided a threaded coupler (not shown) which may be, for example, a threaded bore. In general, this threaded bore may be employed to provide a highly desirable firm threaded connection with a machine point under evaluation. Generally, a small stud provides the union or connection, such a threaded stud being shown at 48. Depending upon the desires of the user, the stud 48 may stand alone as shown, be permanently affixed to the device 40, or be formed as a portion of a probe component. FIG. 2 reveals two varieties of probe components which may be used with the accelerometer 40, an elongate one being shown at 50, having a length, for example, of about 4.78 in. (121.41 mm) and a shorter probe being represented generally at 52. The shorter probe 52 may have a length, for example, of about 0.65 in. (16.51 mm). Each of the probes 50 and 52 are formed having a conical machine contact end shown, respectively, at 54 and 56, and extend rearwardly from that contact end to base portions shown, respectively, at 58 and 60. These base portions 58 and 60 have the same diameter as accelerometer 40 at its contact surface 46, and are formed having rearwardly disposed support surfaces shown, respectively, at 62 and 64. These surfaces 62 and 64 are intended to abut in face-to-face relationship with the transducer contact surface 46 of accelerometer 40. Coupling between the accelerometer and the probes 50 and 52 is through the utilization, for example, of the threaded stud 48 which is threadably engaged within an internally threaded bore (not shown) within the center of each of the base portions 58 and 60. Oppositely disposed from the support surfaces 62 and 64 are respective annulus-shaped retention surfaces 66 and 68. These retention surfaces 66 and 68 are abuttably engaged by an interior abutting surface formed within a forward retainer represented generally at 70. The forward portion 72 of retainer 70 is fashioned in frusto-conical shape, while the rearward portion thereof is cylindrical and externally knurled as at 74 such that the cylindrical interior of that portion 74 may be configured to provide a connector component which threadably engages the connector component 28 of hand support component 12. With the assemblage, as shown in FIG. 1, the forward retainer 70 fits over a probe 50 or 52 which has been attached to the accelerometer 40 utilizing the stud 48. The accelerometer 40, in turn, is electrically as well as mechanically joined through its connector 36 to a corresponding connector at forward mount portion 26. As this connection is made, the back surface 42 of accelerometer 40 abuts against contact surface 30 of mount portion 26. The forward retainer 70 then is threadably engaged with the threads at connector component 28 and tightened down to effect a constrictively tightening connection imposed against the retention surface as at 66 or 68 of respective probes 50 or 52. This then compresses the accelerometer 40 against the mount portion 26 to provide a desirably secure but demountable assemblage which then features the hand grip at portion 14 which may perform in conjunction with store button 16 and LED 18, and which utilizes the same connector cable 22 and associated connector 20 as would be used in non-handle applications of the accelerometer 40.

Turning to FIG. 3, the accelerometer and probe supporting assemblage 10 is illustrated in sectional detail. Looking initially at the rearward portion 24 of hand support component 12, it may be observed that a cylindrical receiving cavity 73 extends inwardly from the center of a rear surface 75 thereof. Looking additionally to FIG. 4, cavity 73 is provided to develop peripheral protection for a multiple lead connector 76 which emulates, and preferably is identical to, the corresponding multiple lead transducer connector associated with accelerometer 40. This permits a multiple mode utilization of the transmission cable 22 and its associated multiple lead connector 20. To facilitate the insertion of the connector 20 with connector 76, FIG. 4 reveals the presence of a detent slot 78 configured for appropriate mating with a detent (not shown) formed upon connector 20. Connector 76 is to seen to be of generally cylindrical configuration and is retained within the cavity 72 by a threaded nut connector 80 which is seen to be positioned within a cavity 82 formed within the handle portion 12. Leads 84 are seen extending from the connector 76 to switch 16 and LED 18 as well as to the forward mount portion 26. Looking additionally to FIG. 5, the forward mount portion 26 and connector component 28 again are revealed as extending to the contact surface 30. Formed inwardly from this contact surface is a cylindrical receiving cavity 86, the bottom surface 88 of which supports a multiple lead intermediate connector 90 which, essentially, is identical to and emulates connector 20. Thus, the transducer connector 36 extending outwardly from accelerometer 40 readily is coupled with the intermediate connector 90 in an arrangement permitting the abutment of the accelerometer 40 back surface 42 with contact surface 30. FIG. 5 shows a detent 96 extending outwardly from the outer cylindrical surface of intermediate connector 90, again, to facilitate the alignment of the five pins and associated slots present with the forming of the connection union. Intermediate connector 90 is seen to be coupled to mount portion 26 by a threaded nut 98 within cavity 82.

FIG. 3 further reveals the hollow interior 100 of retainer 70 which is generally formed as a right cylinder and extends to the rearward portion 74 which is internally threaded to provide a connection component 102 which is seen to threadably engage the corresponding external threads forming the connection component 28. As the forward retainer 70 is rotatably turned to engage the threaded connection components, the annulus shaped interior abutting surface 104 located forwardly within hollow interior 100 engages the annular shaped retention surface 66 of probe 50. As the component 70 thus is tightened, the support surface 62 of probe 50 is urged into compressive contact with the abutting transducer contact surface 46 of accelerometer 40. This compression is transmitted to the corresponding abutting contact between back surface 42 of accelerometer 40 and contact surface 30 of forward mount portion 26. As is apparent, the whole assemblage for this probe utilization embodiment is easily demountable by the technician such that the accelerometer 40 may be utilized in other modes of machine monitoring point contact.

Figure 6:
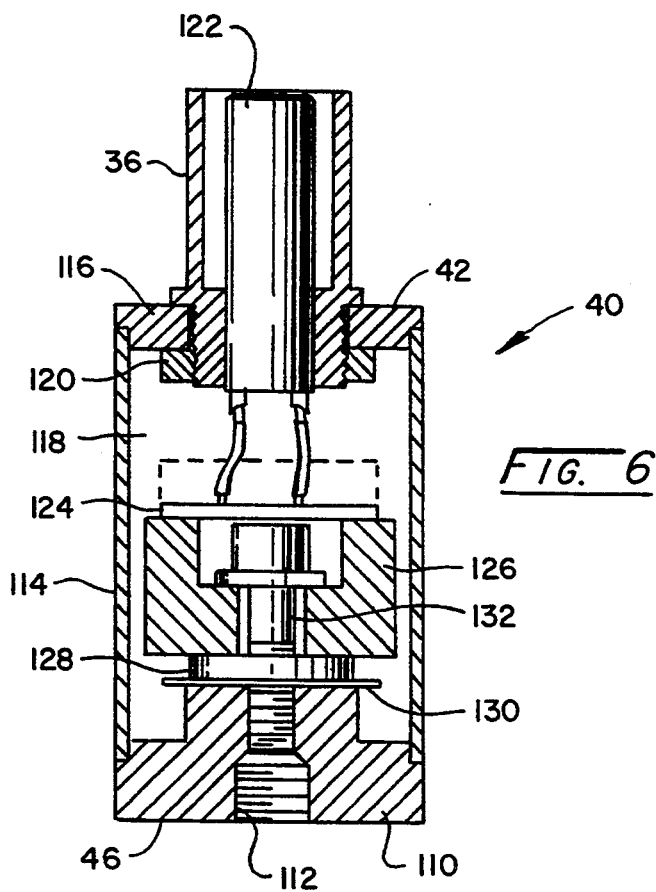
FIG. 6 is a partial sectional view of an accelerometer shown within the assembly represented at FIG. 3.

Looking momentarily to FIG. 6, the components of the accelerometer transducer 40 are represented in general fashion. The cylindrical device, for example, includes a base 110 having the earlier-described contact surface 46. Centrally within this base is a coupler present as a threaded bore 112 which provides attachment to a stud which, in turn, is coupled to a machine vibration measuring point, or which may be connected with stud 48 as described in communication with FIG. 2, for connection with probe devices such as at 50 and 52, as well as for use in connection with a permanent magnet form of mounting. Welded to the base 110 is a cylindrical outer housing 114 which extends, in turn, to a cylindrical top 116, the outer portion of which provides back surface 42. Thus configured, a hollow interior 118 is defined which is in connection with the transducer connector 36. In this regard, connector 36 is seen coupled to top 116 by a threaded connection with a nut 120. A female connective interior portion 122 of the connector 36 is seen having a lead connection with an electronics assembly represented by a printed circuit (PC) board and dashed boundary 124. The electronics represented at 124 are located over a mass defining component 126 which, in turn, is positioned over a piezoelectric crystal 128. Crystal 128, electrically coupled with electronics 124, in turn, sits upon a thin mount 130, in turn, positioned upon base 110. An internally engaged bolt form of connector 132 holds the mass and crystal assemblage together.

Figure 7:
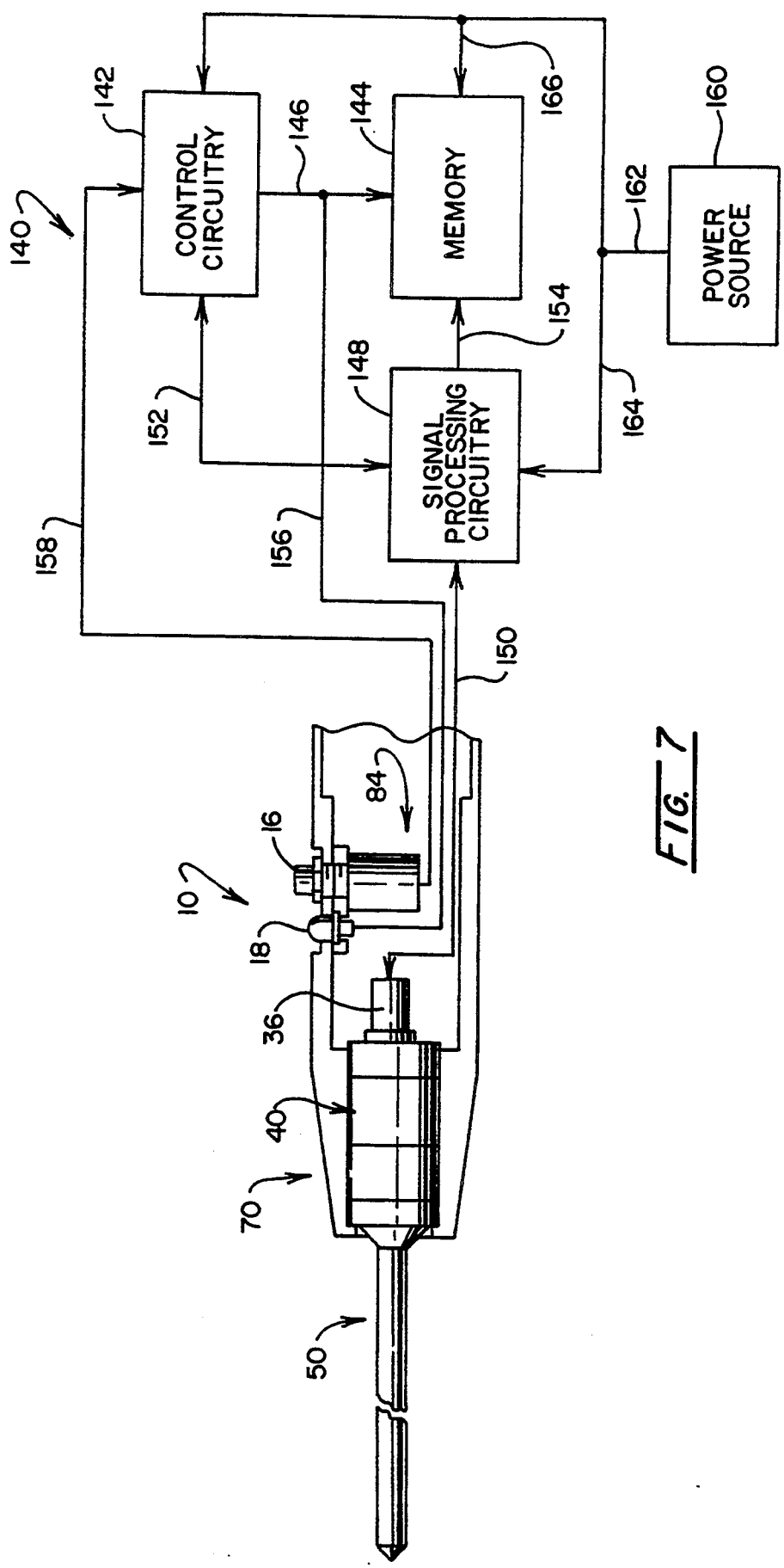
FIG. 7 is a schematic representation of the control components of a data collector and/or analyzer as are associated with an accelerometer, light emitting diode, and switch as described in connection with the mount assembly of the invention.

Looking to FIG. 7, a block diagrammatic representation of the control features of a data collector which may be employed with the assembly 10 is represented generally at 140. One such control is described in the above-identified U.S. Pat. No. 4,612,620, which is incorporated herein by reference. In general, these data collectors will include a microprocessor based control circuitry as represented at block 142 which performs in concert with random access and read only memory as represented at block 144. The interrelationship of that control circuitry as represented at block 142 with memory 144 is represented at dual directional line 146. Additionally performing in conjunction with the memory 144 and control circuitry 142 is a signal processing circuitry represented at block 148. The signal processing circuitry 148 receives analog data and may provide power to the accelerometer 40 as represented at line 150. Typically controlled from the control circuitry 142 as represented at line 152, signal processing circuitry 148 carries out filtering functions, integration functions, and digitization to provide digitized data to the memory 144 is represented by line 154. During the collection of vibrational data which involves the storage thereof in memory 144, LED 16 is energized under the control of circuitry 142 as represented at line 156. This provides a positive perceptive visual feedback to the technician that the system is collecting data and that the accelerometer should be maintained in position for collection of such data. In similar fashion, the auxiliary enter or store switch 16 which is mounted on the assembly 10 provides a control input to control circuitry 142 as represented at line 158. A battery power supply is represented at block 160 having outputs leading to blocks 142, 148, and 144 via lines 162, 161, and 163.

Figure 8:
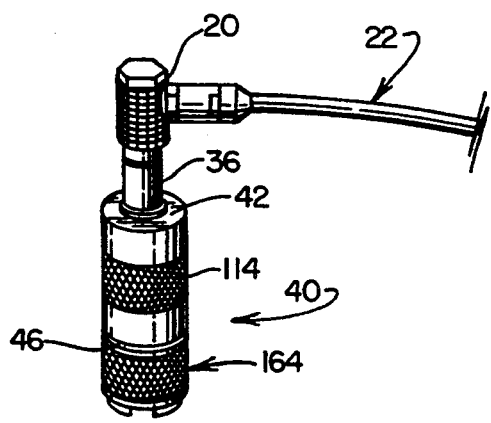
FIG. 8 is a pictorial representation of an accelerometer, transmission cable and cable connector, and a permanent magnet component as are utilized in the absence of the hand support component shown in FIG. 1.
Figure 9:
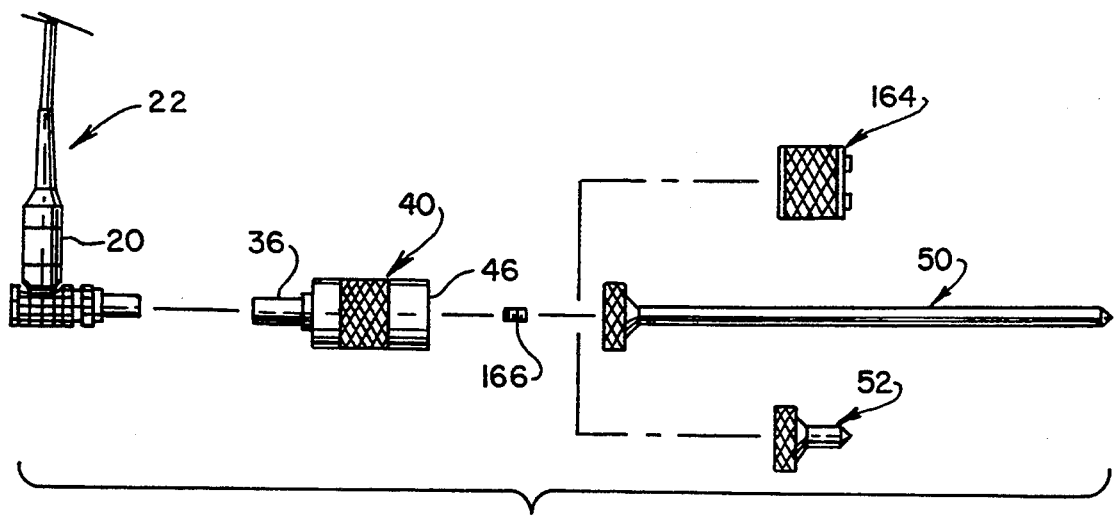
FIG. 9 is an exploded representation of the assemblage of FIG. 8 showing alternative uses of the accelerometer with an elongate and foreshortened probe.

The very quick disassembly of the handle based assembly 12 as represented in connection with FIG. 3, permits the accelerometer 40 to be employed with cable 22 and connector 20 in stand-alone fashion, and in particular, in combination with a permanent magnet. The latter permanent magnet is employed then as the connection of the accelerometer with a machine vibration measurement point. As is apparent, the components of the accelerometer 40 are formed of non-magnetic material such as a non-magnetizable stainless steel. Looking to FIG. 8, the accelerometer 40 is shown as reassembled for this magnetic coupling utilization. In this regard, a cylindrical permanent magnet housing represented, in general, at 164 is connectable to the contact surface 46 of accelerometer 40. Connection is carried out by threaded association utilizing a threaded stud as described earlier at 48. Looking to FIG. 9, the versatility achieved, for example, by providing .for the use of the accelerometer alone without the handle component 12 is represented in expanded fashion. In the figure, transmission cable 22 again is revealed in connection with connector 20. Accelerometer 40 is illustrated as being connectable with the permanent magnet containing housing 164 utilizing threaded stud 166. This same coupling may be employed with elongate probe 50 or foreshortened probe 52. Such flexibility of using the probes 50 and 52 without the handle 14 in conjunction with accelerometer 40 permits the technician to collect vibration data from measurement points which are so constricted in terms of access as to preclude the utilization of the easily grasped handle component 12. Of importance, the mounting assembly of the invention permits conversion to such configurations with ideal swiftness and ease. In the latter regard, the accelerometer 40 is accessed by the simple unscrewing of forward retainer 70, whereupon it is unplugged from the intermediate connector 90 (FIG. 3) and connector 20 with associated transmission cable 22 is then attached to accelerometer connector 36. Thereupon, the selected probe as at 50 or 52, or the magnetic-based connector 164 is threadably connected to device 40.

Figure 10:
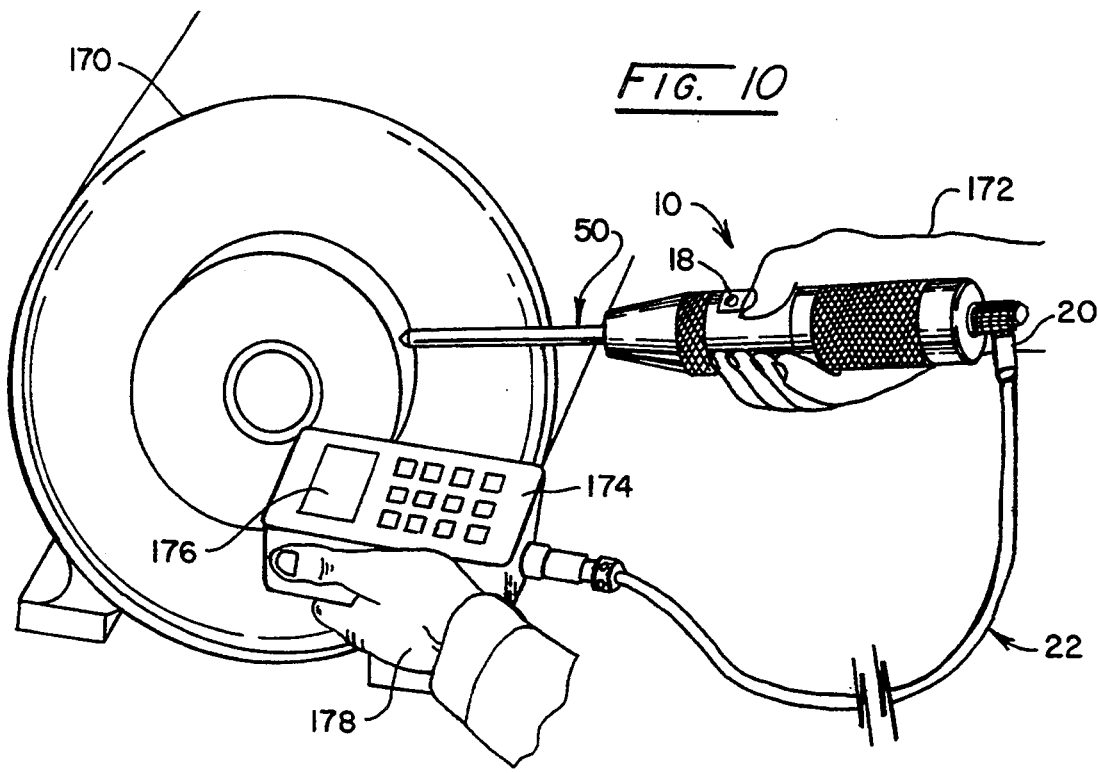
FIG. 10 is a pictorial representation of the assembly in the course of its use in collecting vibrational data.

Looking to FIG. 10, the assembly 10 is shown pictorially in conjunction with a stylized representation 170 of rotational machinery under vibrational evaluation. For clarity, an illustrative arrangement showing machinery which is difficult to access and which thus calls for the elongate probe 50 is not shown. In the figure, the technician's right hand 172 is shown gasping the assembly 10 with the thumb positioned over switch 16. LED 18 is visible to the technician as the probe 50 is held at a measurement point in a horizontal direction. Cable 22 is seen extending to a stylized representation of a data collector 174 having a readout 176 and which is held by the technician's left hand 178.

Figure 11:
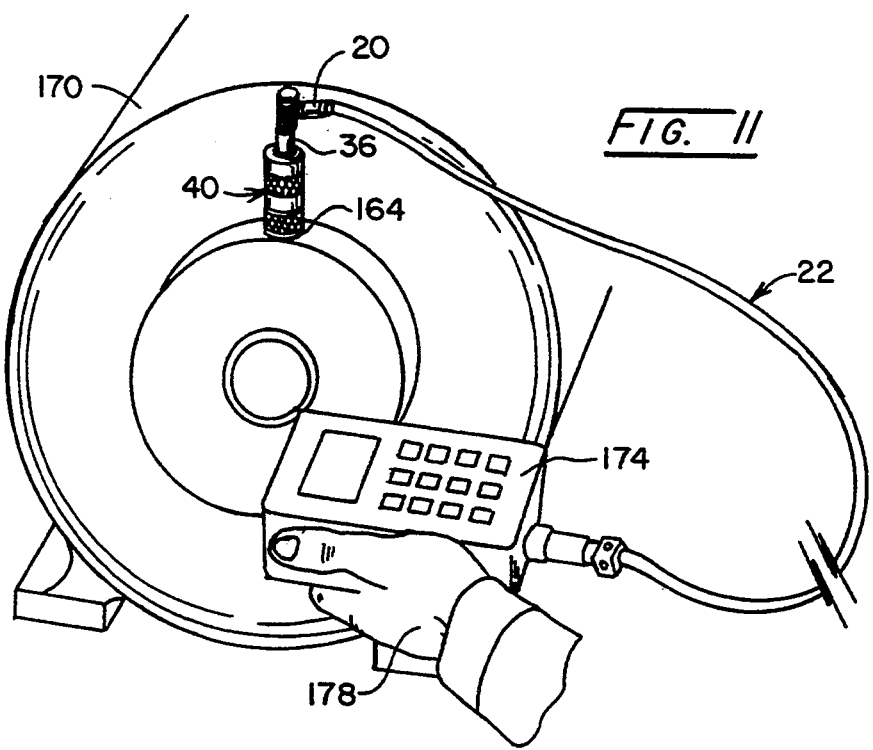
FIG. 11 is a pictorial representation of the utilization of a data collector in conjunction with the assemblage of FIG. 8.

Looking to FIG. 11, it may be observed that where the measurement point at machine 170 is more accessible, a permanent magnet coupling may be employed with the accelerometer 40. In the figure, the technician's left hand 178 is seen supporting the data collector 174 while a hands free coupling of the accelerometer 40 using permanent magnet housing 164 is provided upon machine 170 in a vertical orientation. The transition from the configuration shown in FIG. 10 to that shown in FIG. 11, and back to that of FIG. 10 is quite simply accomplished as described above.

The transducer supporting assemblies as represented in FIGS. 10 and 11 may be employed, for example, with a variety of vibration monitoring and analyzing portable instruments. For example, the assemblies may be utilized with the "FAST TRACK" data collector as well as Models 838, 885, and 890 portable instruments marketed by IRD Mechanalysis, Inc., of Columbus, Ohio.

Since certain changes may be made in the above-described apparatus without departing from the scope of the invention herein involved, it is intended that all matter contained in the above description or shown in the accompanying drawings shall be interpreted as illustrative and not in a limiting sense.

I claim:

1. A mount assembly for use with a vibration transducer of a variety positioned at a machine point under evaluation, said transducer having a transducer contact surface including a threaded coupler connectable with a threaded coupling stud, and an oppositely disposed connector end including a back surface and a multiple lead transducer connector of predetermined configuration for removable coupling with a corresponding multiple lead cable connector of a multiple lead transmission cable, comprising:

a hand support component having a hand graspable handle portion extending between a forward mount portion and a rearward portion, said forward mount portion including a contact surface and a multiple lead intermediate connector configured in correspondence with said cable connector for removable coupling with said multiple lead transducer connector, a second said transducer connector configured in correspondence with said multiple lead transducer connector and mounted upon said hand support component for removable connection with said multiple lead cable connector, and a first connector component formed upon said hand support component at said forward mount portion;

lead means for electrically coupling said second transducer connector and said intermediate connector;

a probe having a contact end for positioning in abutting engagement with said machine point and extending to a base portion having a rearwardly disposed support surface and an oppositely disposed retention surface;

connector means for removably, threadably connecting said probe base portion with said vibration transducer threaded coupler; and a forward retainer having a rearward portion including a second connector component configured for effecting a constrictively tightening connection with said first connector component, having a hollow interior extending to an interior abutting surface surmounting a tip opening and configured for positioning over said vibration transducer and said probe when said multiple lead transducer connector is coupled with said multiple lead intermediate connector, said transducer back surface is in abutment with said forward mount portion contact surface, said probe support surface is abuttably engaged with said transducer contact surface and said interior abutting surface is in abutment with said probe retention surface said forward retainer urging said probe into compressive contact with said vibration transducer and said vibration transducer into compressive contact with said forward mount portion contact surface when said forward retainer second connector component effects said constrictively tightening connection.

2. The mount assembly of claim 1 including:
a magnetic connector including a forwardly disposed permanent magnet, a rearwardly disposed vibration transfer surface and a threaded stud, said threaded stud being connectively engageable with said transducer threaded coupler to effect contacting engagement of said vibration transfer surface with said transducer contact surface in the absence of said hand support component and said forward retainer.

3. The mount assembly of claim 1 including a switch mounted upon said hand support component adjacent said forward portion and hand actuable for carrying out a select switching of said lead means.

4. The mount assembly of claim 3 including a perceptible indicator mounted upon said hand support component and energizable from said lead means to emit visible light when said switch is actuated.

5. The mount assembly of claim 1 including a perceptible indicator mounted upon said hand support component and energizable from said lead means to emit visible light.

6. The mount assembly of claim 1 in which:
said hand support component is cylindrical and includes an internally disposed cavity;
said lead means is located within said internally disposed cavity; and
said first connector component is an externally threaded cylindrical portion of said forward mount portion extending rearwardly from said forward mount portion contact surface.

7. The mount assembly of claim 6 in which said forward retainer second connector component comprises a threaded portion internally disposed within said hollow interior.

8. The mount assembly of claim 7 in which said forward retainer is configured generally having a frusto conical shape.

9. In a machine vibration monitoring system employing a cylindrical accelerometer of given diameter, having an accelerometer contact end with a threaded bore and an oppositely disposed connector end with a back surface and an outwardly extending multiple lead transducer connector of predetermined configuration, said transducer connector being removably connectable with a corresponding cable connector of a transmission cable extending to the signal treatment components of a portable memory containing data receiver having a control circuit responsive to hand actuation to receive an output from said accelerometer When located at a machine point under evaluation, a mount assembly for use with said accelerometer, comprising:

a hand support component having a hand graspable cylindrical handle portion of first diameter with an internally disposed cavity, said handle portion extending between a forward mount portion and a rearward portion, said forward mount portion including a cylindrical, externally threaded first connector component extending forwardly to a contact surface and a first receiving cavity extending inwardly from said contact surface within which is mounted an intermediate connector configured in correspondence with said cable connector and to operatively receive said accelerometer outwardly extending transducer connector in an orientation effecting the abutment of said back surface with said contact surface, said rearward portion supporting a second said transducer connector of said predetermined configuration for removable connection with said cable connector;

lead means within said internally disposed cavity of said handle portion for electrically coupling said intermediate connector with said second transducer connector;

a probe having a contact surface for positioning in abutting engagement with said machine point and extending to a circular base portion of diameter corresponding with said accelerometer given diameter, said base portion having a rearwardly disposed support surface and an oppositely disposed retention surface;

connector means for removably, threadably connecting said probe base portion with said accelerometer threaded bore and effecting an abutting contact between said base portion and said accelerometer contact end; and a forward retainer having an open, cylindrically shaped interior with a rearward portion including an internally threaded second connector component, said interior extending forwardly to an annulus shaped interior abutting surface abuttably engageable with said probe retention surface when said transducer connector is coupled with said intermediate connector with said abutment of said back surface with said contact surface, said probe base portion is in abutting contact with said accelerometer contact end, said forward retainer is positioned over said probe and said accelerometer and said second connector component effects a rotationally derived constrictive tightening connection with said first connector component.

10. The mount assembly of claim 9 including a perceptible indicator mounted upon said hand support portion and energizable from said lead means to emit visible light.

11. The mount assembly of claim 9 including a switch for providing said hand actuation mounted upon said hand support component adjacent said forward mount portion and hand actuable for carrying out a select switching of said lead means.

12. The mount assembly of claim 11 including a perceptible indicator mounted upon said hand support component and energizable from said lead means to emit visible light when said switch is actuated.

13. The mount assembly of claim 9 in which said cylindrical, externally threaded first connector component is of a second diameter, less than said first diameter.

14. The mount assembly of claim 13 in which said forward retainer rearward portion has a diameter which is co-extensive with said handle portion first diameter.

15. The mount assembly of claim 14 in which said forward retainer is configured generally having a frusto conical shape.

16. The mount assembly of claim 9 in which said hand support component rearward portion includes a rear surface and a second receiving cavity extending inwardly from said rear surface within which is mounted said second transducer connector.

17. A mount assembly for use with a vibration transducer having a transducer locatable at a machine point under evaluation contact surface and an oppositely disposed connector end including a back surface and a transducer connector removably connectable with a cable connector of a transducer cable extensible to a portable data receiver having a memory and which is responsive to a switched input to carry out a store function with respect to said memory, comprising:

a hand support component having a hand graspable handle portion extending between a forward mount portion and a rearward portion, said forward mount portion including a centrally disposed multiple lead intermediate connector configured in correspondence with said cable connector, and a threaded first connector surmounting said intermediate connector, a second said transducer connector corresponding with said cable connector, mounted upon said hand support component, removably connectable with said cable connector and in electrical communication with said intermediate connector;

a switch mounted upon said hand support component, in electrical communication with said second transducer connector and actuable to derive said switched input;

a probe having a contact end for positioning in abutting engagement at said machine point and extending to a base portion removably connectable with said transducer contact surface; and forward retainer means having a rearward portion including a threaded second connector threadably engageable with said first connector and having a hollow interior extending to a forwardly disposed interior abutting surface surmounting a tip opening and positionable over said transducer and said probe when said transducer connector is coupled with said intermediate connector and said probe base portion is connected with said transducer contact surface, for retaining said probe and said vibration transducer against said probe base portion.

18. The mount assembly of claim 17 in which said forward retainer is configured generally having a frusto conical shape.

19. The mount assembly of claim 18 in which:
said handle portion is cylindrically shaped, having an external surface of first diameter selected for facilitating hand grasping; and
said forward retainer rearward portion is cylindrical, having an external surface of diameter co-extensive with said handle portion first diameter.

20. The mount assembly of claim 19 in which said first connector is cylindrical, externally threaded, and of diameter less than said first diameter.

* * * * *